Oct. 1, 1929.    F. B. WATSON ET AL    1,729,654
METHOD OF MAKING BIFOCAL LENSES
Filed Feb. 26, 1927

Inventors
FRANK B. WATSON,
EDWARD CULVER,
BY Toulmin & Toulmin
Attorneys

Patented Oct. 1, 1929

1,729,654

UNITED STATES PATENT OFFICE

FRANK B. WATSON AND EDWARD CULVER, OF LONDON, ENGLAND, ASSIGNORS TO UNITED KINGDOM OPTICAL COMPANY, LIMITED, OF MILL HILL, LONDON, ENGLAND

METHOD OF MAKING BIFOCAL LENSES

Original application filed November 21, 1925, Serial No. 70,586, and in Great Britain April 29, 1925. Divided and this application filed February 26, 1927. Serial No. 171,217.

Our invention relates to a method of manufacturing fused bifocal lenses.

It is the object of our invention to provide a method of fusing bifocal lenses so that the fused inserts may be positioned at varying positions relative to the main lens or counter sink notwithstanding the variation in form and size of the insert with respect to the counter sunk portion of the main lens.

It is a further object to provide a method of manufacturing such lenses so that they will be accurately positioned initially when the fusing starts, and will be automatically maintained in the accurate position desired during the fusing, so that the resulting lens will be accurately formed.

It is a further object to provide such steps in our method that the resulting lenses will be homogeneous, and mechanically and optically perfect, despite the fact that they are produced in quantities.

This application is a division of application Serial No. 70,586, filed November 21, 1925.

Referring to the drawings.

Referring to the details of our method, we prepare molded blanks of crown glass 1, preferably of index 1.5232, ground and smoothed in order to fit carborundum slabs 2.

Figure 1:
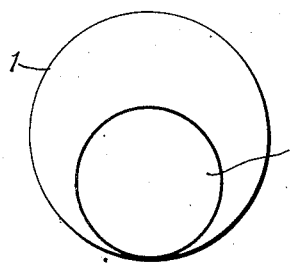
Figure 1 is a plan view of a counter sink with the circular depression for receiving the button located near the margin of the counter sink.
Figure 2:
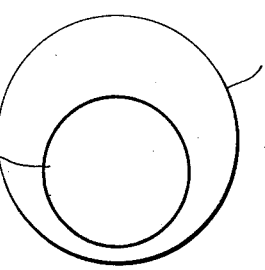
Figure 2 is a similar view with the depression located nearer the center of the counter sink.
Figure 3:
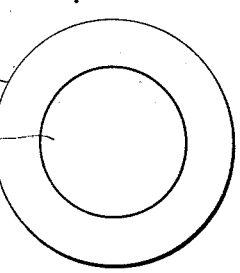
Figure 3 is a view showing the counter sink depression and the counter sink itself geometrically centered.
Figure 4:
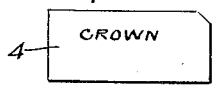
Figure 4 is a plan view of one of the inserts constituting a portion of the button, such as the crown insert.

We then grind the counter sink to the circular depression 3 in any one of the locations shown in Figures 1, 2 and 3 depending upon the position of the insert as desired in the finished lens.

In locating these depressions, we keep in mind that we desire the finished product to have a single geometrical optical center for both distance and reading portions as near as may be possible, although this is not essential because many of our lenses are not so arranged.

One of the fundamentals of our invention is to provide these counter sink portions with a polish very much finer and more accurate, absolutely free from any pitting.

Heretofore, a good felt polish finish has been sufficient, but we find it necessary to use a material consisting of fiber-pitch and wax so as to insure the depressions being absolutely free from holes or what is known as curdly surface, thereby eliminating any variations which might make the fusing imperfect.

We then take the segments, which constitute the button, the exact proportion of which is hereinafter explained, and assemble these segments either in combinations of one semi-circular flint segment 5 and one oblong crown segment 4, or two oblong crown segments and one oblong flint segment.

Figure 8:
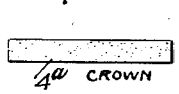
Figure 8 is one side of one of such sections showing the gray edge thereof on the crown portion.
Figure 9:
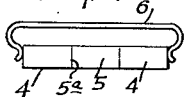
Figure 9 is an end elevation of a series of sections constituting the button being held in position for fusing, the center section being flint and the side sections being crown on the sides of the flint section of the button.
Figure 10:
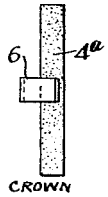
Figure 10 is a side elevation thereof showing the gray edge of the crown sections.

We prefer to have the edges of the crown segment unpolished or gray, as indicated at 4ª in Figure 8, or Figure 10.

As to the flint sections 5, one edge 5ª is then ground plano and finished until it is a constant free from any small pits. It is desirable to have this finished with this uniform surface, but not highly polished so as to avoid any light reflections which would result from high polishing, i. e. it is given a semi-polish where it meets the crown segments.

It will be understood that the gray appearance of the joining edges of the crown-glass segments and the semi-polished appearance of the joining edges of the flint-glass segments are due to scattering of light reflections, the gray being due to the grosser microscopic projections following rough grinding, and the semi-polish to finer and shorter projections. This grinding of the crown-glass edges rougher than the flint-glass edges is very important as an aid to the solution of two of applicants' problems in carrying out this invention; viz, that of minimizing the optical prominence in the finished lens of the lines between the major and minor elements, and that of reducing the difference in time between the arrival at welding fusion of the flint-glass edges and the crown-glass edges, due to the higher fusion-point of crown-glass.

When the gray edge of a crown-glass segment is clipped firmly against the semi-polished edge of a flint-glass segment, there is necessarily a degree of meshing together of the microscopic projections, much as might be the case if two wire brushes, one with short and the other with long wires, were stuck together, and upon fusion the overlapping projections would fuse together into a fine line of glass of intermediate refractive index, transition of the sight through which, from lens to lens, would be optically less abrupt than if the two segments were in sharper contact. Moreover, because of freer access of heat to the relatively long projections constituting the gray edge, the gray edge would fuse more quickly than the main body of the crown-glass segment, thus lowering the danger of excessive, distortion-producing fusion of the flint-glass segment. To effect safe fusion of the two kinds of glass, with their contacting edges finished as described, approximately fifteen minutes has been found, by experiment, to be the best time at the temperature made use of (620 deg. C.), as will be later explained.

Figure 5:
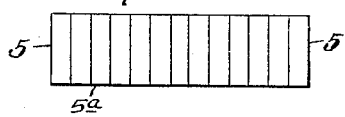
Figure 5 is a side elevation of a group of flint sections joined together for uniform polishing and finishing on the edges thereof.
Figure 6:
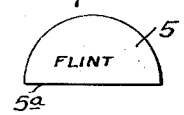
Figure 6 is a semi-circular section of one of the flint button sections.
Figure 7:
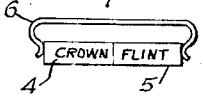
Figure 7 is a side elevation of a pair of button sections held together by a slip for fusing.

The flint portion of the segment should be an extra dense flint with an index of 1.6495 to 1.652, and of proved expansion qualities. These flint portions of the glass are cut into oblong slabs 5. The sides are smoothed plano and they may be assembled into groups side to side, as in Figure 5, by means of the Swedish pitch. A good wax may be used. The top and bottom edges are then ground and reduced to approximately 9¼ millimeters with both sides parallel and smoothed finely, so that there are no pits.

They are then lightly polished with a pitch polish which keeps them free from aberration and which does not form small pits as with the ordinary felt polish.

They are then cleaned with a solvent and dried with a cloth of such a character that it does not leave any lint or threads on the surface.

Figure 11:
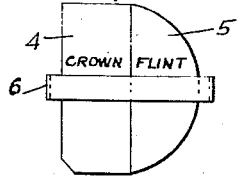
Figure 11 is a plan view of Figure 7.
Figure 12:
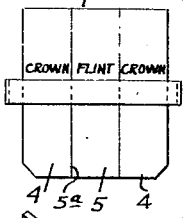
Figure 12 is a plan view of Figure 9.

We join the edges of these segments by holding them together in a clip 6 and fusing them together. This fused button shown in either Figures 11, 12, or 15, consisting of a portion of crown glass and a portion of flint glass is located in the depression 3 of the countersink 1 which is mounted on the carborundum base 2. It is held in position by a clip 7, which engages the top of the button and the bottom of the carborundum slab.

In order to position the button in the counter sink, we provide angled feelers 8, one portion of which is below the button and the other portion of which is against the edge, which feelers serve to hold the button in position and completely melt into the lens without injuring it through the fusing process, and thereby provide means of positioning the lens and compensating for the conditions which occur through fusing, so that the insert will not be displaced. This zinc feeler is later removed by grinding.

We find that, due to holding the buttons in position by means of the spring clips with very slight pressure that this has a slight tendency to raise one end or side of the segment from the counter sink with the ultimate result of imperfect fusing caused with imperfect contact unless feelers are used.

These feelers, when placed in proper positions in the counter sunk portion of the main lens, hold the flint insert away from the counter sink, permitting it to drop evenly for perfect fusing. These feelers are sheet zinc and will melt before the fusing temperature is high enough for this flint insert to drop.

Figure 15:
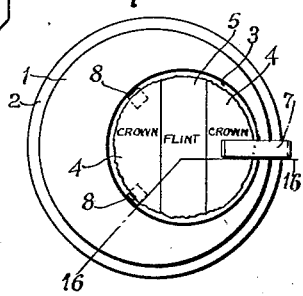
Figure 15 is a plan view of the carborundum base, counter sink, button, clip and feelers in position.
Figure 13:
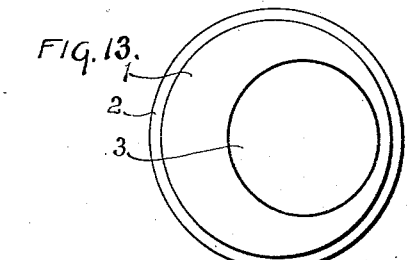
Figure 13 is a view of the counter sink mounted on a carborundum slab.
Figure 14:
Figure 14 is an enlarged side elevation of a feeler.
Figure 16:
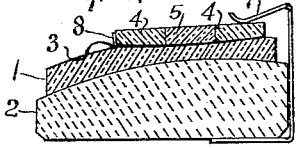
Figure 16 is a section on the line 16—16 of Figure 15.
Figure 18:
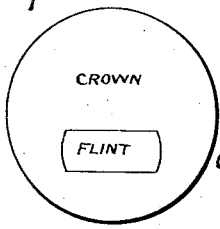
Figure 18 is a plan view of the completed lens.
Figure 17:
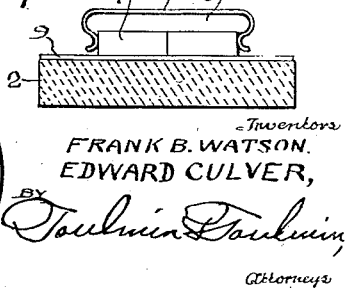
Figure 17 is a side elevation of the carborundum slab used for fusing the segments to one another, with a clipped assemblage of button segments thereon.

The combination as shown in Figures 15 and 16 is then inserted in the furnace, preferably in an electric furnace, and the temperature raised to about 700 degrees centigrade and kept at that temperature for about fifteen minutes.

The furnace is then allowed to cool about fifty degrees in the next thirty minutes, whereupon the current is shut off and the lenses cool in the closed furnace gradually for a period of about fifteen hours.

It will be understood that the crown portions of the buttons are of the same refraction index and expansion as the counter sink or distance portion. They are also preferably of the same material as the counter sink in order that there shall not be the slightest dispersion or variation in the lenses as a finished product because the crown portions must be fused homogeneously.

The clips used in all fusing operations are made of Monel metal or other similar non-corrosive material.

Care must be taken to prevent any dust between contact surfaces as this will result in air bubbles.

The segments are now shanked or chipped to circles as large as possible and one side is brightened plano. They are turned then to the other side where the contact curve is ground as desired.

Great care must be exercised in not having the slightest rounding or aberration at the dividing lines which would render the combination useless for fusing to the counter sink.

In order that the accuracy of the fit between the button and counter sink may be understood, it is desirable and essential that the segment must be nearly the same by color contact, which is a most exacting method of testing curvatures.

In preparing the segments, it is desirable to leave one edge, that is the outer edge, quite rough so that it may be readily distinguished from the contact side which engages with the other portion of the segment.

This refers to the crown portions of the segments.

It will be understood that the construction shown in Figures 7 and 9 and Figures 11 and 12, when assembled, are placed in the furnace which is raised to 620 degrees centigrade and kept there at that temperature for about 15 minutes before being allowed to slowly cool.

During the heating, they are mounted on carborundum slabs which are dusted with powdered mica to prevent the soft glass from sticking.

It is after this time that the resulting button has imparted to it the curvature of the button shown in Figure 15. The side on which the mica has been placed should be brightened plano and fairly well polished, but no special care is necessary as to the holes or rounding.

The other side is then worked to the proper curvature to fit in the counter sink.

When the fusing takes place, the button sections drop together as a unit so as to fit perfectly in the depression; the crown portions of the button fuse into the crown countersink and the whole becomes an internal unit there being a visible, but not optically objectionable line of division between the flint segment and the crown countersink. Obviously, after the fusion, the outer edges of the flint portions may be chipped to conform roughly to the configuration of the desired button.

It will be understood that we desire to comprehend within our invention such modification as may be necessary to adapt it to varying conditions and uses.

Having thus fully described our invention, what we claim as new and desire to secure by Letters Patent, is:—

1. In a method of forming a button for insertion in a lens, providing a crown portion, forming gray abutting edges thereon, forming a flint-glass portion with semi-polished abutting edges, supporting said crown-glass and flint-glass portions with their abutting edges in close contact whereby no relative lateral or vertical slipping will take place between the portions during fusing with resulting low visibility of the line of union of the segments, and fusing said portions together.

2. In a method of making lenses, assembling a crown portion having a gray abutting edge and a flint portion having a semi-polished abutting edge, holding the portions to one another, placing them on a support not affected by heat, placing them in a furnace on the support, fusing in said furnace at 620 degrees centigrade for fifteen minutes and allowing to cool in the furnace for approximately fifteen hours.

3. The method of welding segments of glass of different refractive indices edge to edge so as to secure low visibility of lines of union of said segments, consisting in forming each abutting edge of segments of lower index with a semi-polish, forming each edge of segments of higher index with a finish rougher than that of said edges of segments of lower index, holding in firm contact with each other corresponding edges of segments of different index, and fusing said edges together.

4. In bifocal lens manufacture, the method of making buttons of joined segments of optical glass, which consists in surfacing gray and free from rounding or other aberration, each abutting edge of segments of higher index, finishing each abutting edge of segments of lower index to a uniform, non-light-reflecting surface, without rounding or other aberration, clamping together corresponding abutting edges of segments of low index and high index, supporting said segments against relative movement, heating said assemblage in a furnace to about 620 degrees centigrade for about fifteen minutes, slowly cooling said furnace with said assemblage therein for about fifteen hours.

5. In a method of melting segments of glass of different indices of refraction having different melting points, imparting to said segments roughened edges, joining said edges, and fusing said segments so joined on said edges while supporting said segments without movement.

6. In a method of melting segments of glass of different indices of refraction having different melting points, imparting to said segments roughened edges, joining said edges, fusing said segments so joined on said edges while supporting said segments without movement, and heating said segments to fuse them at such temperature for such time as to bring about fusing on the edges without distortion of the segments and without relative slipping.

7. In a method of melting segments of glass of different refractive indices edge to edge so as to secure low visibility of lines of union of said segments without distortion, forming each abutting edge of the segments with a semi-polished surface of different degrees of polish, and fusing said segments one to the other.

In testimony whereof, we affix our signatures.

FRANK B. WATSON.
EDWARD CULVER.